US010569368B2

(12) United States Patent
Maki et al.

(10) Patent No.: US 10,569,368 B2
(45) Date of Patent: Feb. 25, 2020

(54) PLASMA TRANSFER WIRE ARC WIRE FEED CONTROL SYSTEM

(71) Applicant: FORD GLOBAL TECHNOLOGIES, LLC, Dearborn, MI (US)

(72) Inventors: Clifford E. Maki, New Hudson, MI (US); Antony George Schepak, Howell, MI (US); James Maurice Boileau, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 285 days.

(21) Appl. No.: 15/648,899

(22) Filed: Jul. 13, 2017

(65) Prior Publication Data

US 2019/0015936 A1    Jan. 17, 2019

(51) Int. Cl.
| B23K 10/00 | (2006.01) |
| B23K 35/02 | (2006.01) |
| B23K 10/02 | (2006.01) |
| C23C 4/131 | (2016.01) |
| C23C 4/134 | (2016.01) |

(52) U.S. Cl.
CPC ........ *B23K 35/0261* (2013.01); *B23K 10/027* (2013.01); *C23C 4/131* (2016.01); *C23C 4/134* (2016.01)

(58) Field of Classification Search
CPC .............. B23K 35/0261; B23K 10/023; B23K 10/006; C23C 4/131; C23C 4/134; H05H 1/26; H05H 1/34; H05H 1/36; H05H 1/42

USPC ................. 219/121.54, 121.47, 76.15, 76.16
See application file for complete search history.

(56) References Cited

U.S. PATENT DOCUMENTS

| 6,076,742 | A | * | 6/2000 | Benary | ................... B05B 7/224 219/76.14 |
| 7,210,638 | B2 | * | 5/2007 | Tujii | ........................ B05B 3/02 219/76.14 |
| 7,341,763 | B2 | | 3/2008 | Miyamoto et al. | |
| 8,803,033 | B2 | * | 8/2014 | Nangle | ................ B23K 3/0384 219/137.7 |
| 2005/0023263 | A1 | * | 2/2005 | Blide | ..................... B23K 9/295 219/132 |

FOREIGN PATENT DOCUMENTS

| DE | 102008024237 A1 | 12/2009 |
| JP | 05168985 A | 7/1993 |
| JP | 0790537 A | 4/1995 |
| JP | 2006213998 A | 8/2006 |
| JP | 5149683 B2 | 2/2013 |

* cited by examiner

*Primary Examiner* — Mark H Paschall
(74) *Attorney, Agent, or Firm* — Vincent Mastrogiacomo; Brooks Kushman P.C.

(57) ABSTRACT

A wire feed control system includes an anti-twist mechanism and a controller programmed to operate the anti-twist mechanism, responsive to a measured degree of twist of a wire on a trajectory between a feed for the wire and a plasma transfer wire arc (PTWA) torch, to maintain the degree of twist within a predetermined range defined by natural rotation introduced to the wire by the PTWA torch.

20 Claims, 8 Drawing Sheets

PLASMA TRANSFER WIRE ARC WIRE FEED CONTROL SYSTEM

TECHNICAL FIELD

The disclosure relates to a Plasma Transfer Wire Arc (PTWA) wire feed control system and a monitoring method for the wire feed control system.

BACKGROUND

Various strategies have been developed to improve automotive fuel efficiency. For example, developing automotive parts from lightweight materials has been implemented to reduce weight of vehicles. A plasma transferred wire arc (PTWA) coating on engine parts has been utilized to meet the ever-increasing fuel efficiency goals. For example, a PTWA coating on aluminum alloy cylinder bores has proven to offer several advantages besides weight reduction. For example, the PTWA coating on cylinder bores reduces weight, cost, and bore spacing when compared to an aluminum engine block with thick iron cylinder liners. In addition, the PTWA process has been used to provide a coating on other automotive parts. Yet, the PTWA process faces several challenges.

SUMMARY

In at least one embodiment, a wire feed control system is disclosed. The system includes an anti-twist mechanism. The system also includes a controller programmed to operate the anti-twist mechanism, responsive to a measured degree of twist of a wire on a trajectory between a feed for the wire and a PTWA torch, to maintain the degree of twist within a predetermined range defined by natural rotation introduced to the wire by the PTWA torch. The controller may be further programmed to derive the measured degree of twist from residual stress data of the wire. The system may further include a sensor, wherein the controller may be further programmed to operate the sensor to collect the residual stress data. The sensor may be an ultrasonic sensor. The sensor may be a displacement transducer. The anti-twist mechanism may include a set of rollers surrounding the wire. The anti-twist mechanism may be adjacent to an exit of the feed. The anti-twist mechanism may be adjacent to an entrance of the PTWA torch.

In an alternative embodiment, a wire feed control system is disclosed. The system includes a controller programmed to alter a twist of a wire traveling between a wire feed mechanism and a plasma transfer wire arc (PTWA) torch based on a residual stress differential of the wire to prevent a degree of the twist from exceeding a predetermined threshold. The system may further include an anti-twist mechanism, wherein the controller may be further programmed to operate the anti-twist mechanism to alter the twist of the wire. The anti-twist mechanism may include a set of rollers surrounding the wire. The anti-twist mechanism may be adjacent to an exit of the feed. The predetermined threshold may be defined by natural rotation introduced to the wire by the PTWA torch. The system may further include a sensor, wherein the controller may be further programmed to operate the sensor to collect residual stress data.

In a yet another embodiment, a monitoring method for a wire feed control system is disclosed. The method includes altering by a controller a twist of a wire traveling between a wire feed mechanism and a plasma transfer wire arc (PTWA) torch, in response to a degree of the twist exceeding a predetermined threshold based on a residual stress differential of the wire. The wire feed control system may further include an anti-twist mechanism, wherein the controller may be further programmed to operate the anti-twist mechanism to alter the twist of the wire. The anti-twist mechanism may include a set of rollers surrounding the wire. The anti-twist mechanism may be adjacent to an exit of the feed. The predetermined threshold may be defined by natural rotation introduced to the wire by the PTWA torch. The wire feed control system may further include a sensor, wherein the controller may be further programmed to operate the sensor to collect residual stress data.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

In recent years, Ford and other companies have started using PTWA and other methods for applying thin coatings to cylinder bores. A typical PTWA application involves a thin wear-resistant coating on an aluminum alloy cylinder bore. The main advantages of such application are reduced weight and/or cost and/or bore spacing, compared to an aluminum engine block with thick iron cylinder liners.

Figure 1:
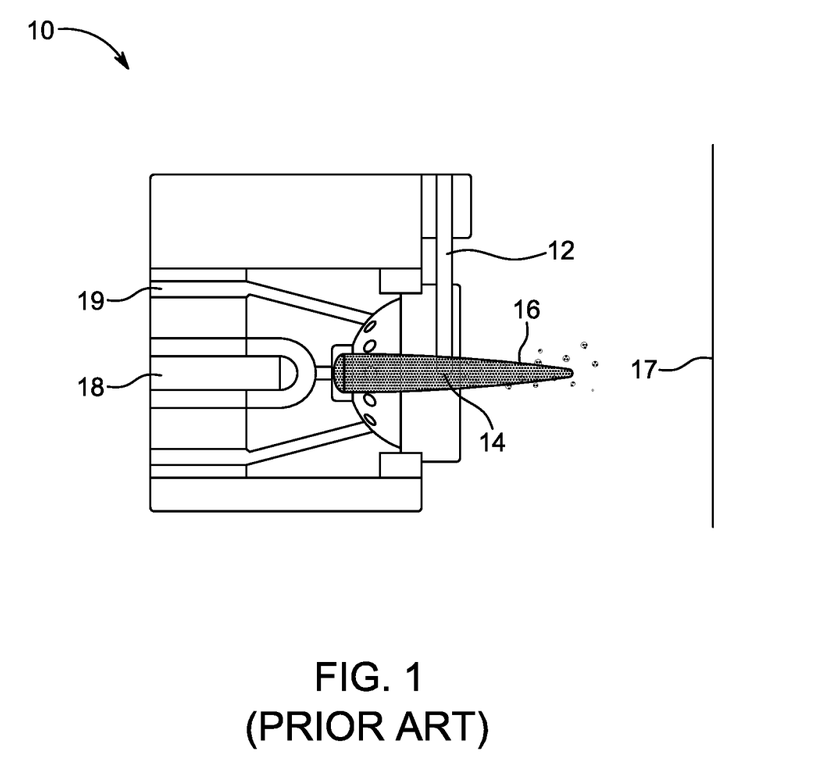
FIG. 1 depicts an example schematic view of a prior art PTWA torch system including a PTWA torch and a wire serving as a consumable electrode.

The PTWA thermal spraying, also called the PTWA surfacing, is a high energy, inert gas welding process, in which a coating is deposited onto a substrate. An example of a PTWA system 10 including a torch with the wire is displayed in FIG. 1. As was stated above, the PTWA spraying is utilized, for example, in coating of engine cylinder bores. A method to apply a PTWA coating onto a substrate is achieved by a plasma wire weld head with separate gas shield and wire feeds along with A/C electrical current. During PTWA spraying, powder and/or a single conductive wire 12 is fed into the system. A supersonic plasma jet 14 melts the wire 12, atomizes the wire 12, and propels the melted wire as molten particles 16 onto a substrate 17 to be coated. The plasma jet 14 is formed by a transferred arc between a tungsten cathode 18 and the wire 12 serving as an anode. Forced atomizing gas 19 transports the atomized wire particles 16 onto the substrate 17, where the particles 16 flatten when they impinge on the surface of the substrate 17 due to their high kinetic energy. The particles 16 subsequently rapidly solidify and form a highly wear-resistant coating.

As was stated above, the PTWA process itself faces several challenges. For example, conveying the wire from a wire feedstock to the cathode in a steady and efficient manner is ideal. Yet, the wire, on its trajectory to the cathode, may get twisted, kinked, or otherwise exceed an acceptable degree of torsion. Various abrupt changes of the wire curvature may occur as the wire travels throughout the system towards the torch. The twists and changes affect reliability and efficiency of the PTWA process in a negative way.

A variety of mechanisms have been developed to attempt prevention of the undesirable twists of the wire. For example, a wire feed stock may be placed on a rotating table while the wire is being pulled off of the rotating table at a constant orientation. Alternatively, one or more wire straighteners may be implemented in the system to attempt keeping the wire straight. Yet, none of these devices or systems have an ability to detect a twist and/or manage a twist when it occurs in the wire trajectory. Thus, even with devices like straighteners included in the system, residual and/or reactionary twists beyond an acceptable degree may be present in the wire.

Another approach implements only a very short trajectory. The wire run is short such that kinking and twisting of the wire is limited within the short travel distance. Yet, the system is inapplicable to normal-size and large-size wire spools and may not be cost efficient for continuous production.

Thus, it would be desirable to develop a system which would be capable of detecting and/or managing twists, kinks, and/or other undesirable behavior of a feedstock wire in the PTWA system to optimize the PTWA process. It would be further desirable to develop a system with an active feedback system capable of sensing the wire twist when it occurs and actively correct the degree of twist to or below the threshold value. Such system would be proactive as opposed to reactive.

Figure 2A:
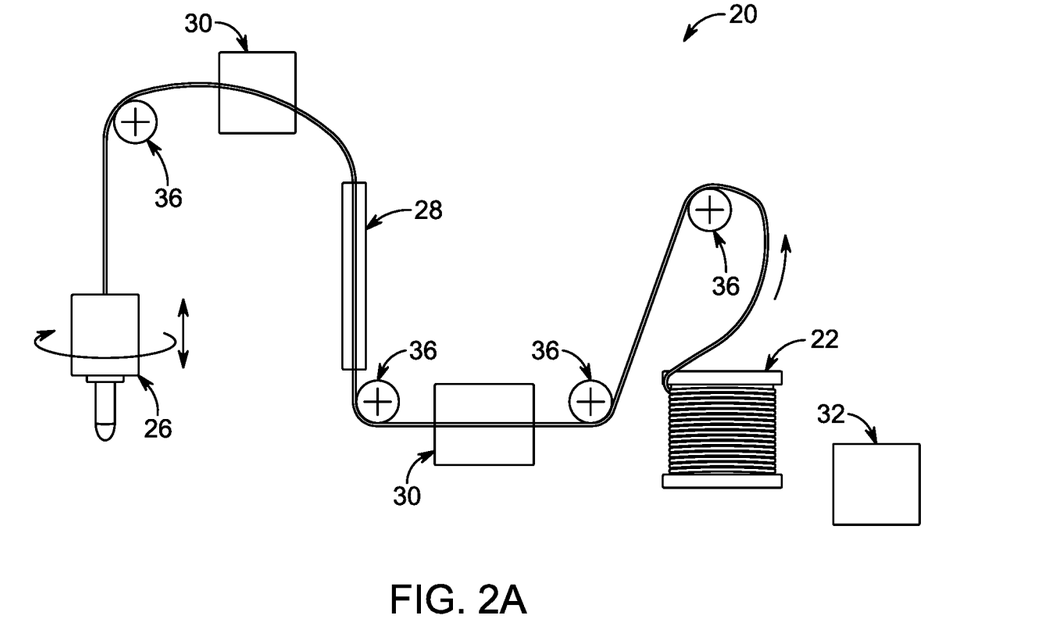
FIGS. 2A and 2B show example PTWA systems with a wire trajectory and devices assisting with correcting wire torsion according to one or more embodiments.
Figure 2B:
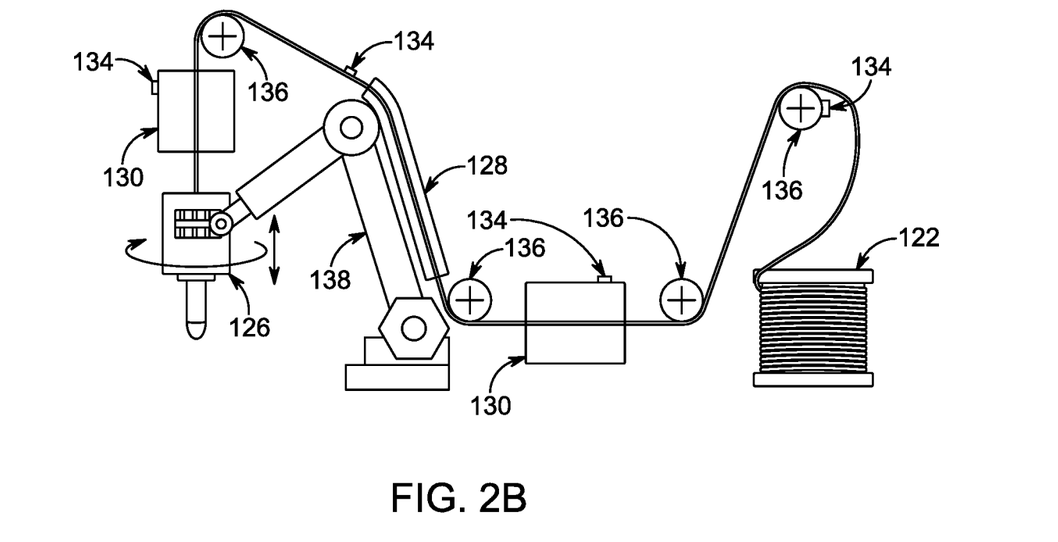

In one or more embodiments, a wire feed system 20 for PTWA is disclosed. An example of the system 20 is depicted in FIGS. 2A, 2B. The system includes a feed 22 for the wire feedstock 24. The feed 22 may include a coil of wire. The feed 22 may include a reel or another drum-shaped object used to carry, store, and/or supply the wire 24 to the system 20.

The wire feedstock 24 includes a single wire. The wire 24 is a conductive wire suitable for PTWA applications. The coating applied to a surface of a component being coated via the PTWA process is essentially the same material that composes the feedstock wire 24. Any conductive material capable of being melted and accelerated via forced gas stream may be used. The material may be metal including one or more metals. The material may be ferrous, steel. The wire may include refractory metals, low-melt materials, alloys, or a combination thereof. The material may include non-metallic components. The wire material may be corrosion resistant. The wire may include a core and an outer layer, both the core and the outer layer having the same or different composition. For example, the core may include metal oxides, metal carbides, both, or the like.

The wire may include a protective sleeve 28 or travel through a protective sleeve 28 during at least a portion of its trajectory from the feed 22 to the torch 26. The protective sleeve 28 may be metallic, ceramic, plastic, or a combination thereof. The protective sleeve 28 has a larger diameter than the wire 24.

The wire 24 travels from the wire feed 22 to the PTWA torch or spray gun 26. Any PTWA-suitable torch is contemplated. The torch 26 rotates clockwise or anti-clockwise. The torch 26 may translate in additional directions such as towards and away from the wire with respect to the wire 24 trajectory. The torch 26 rotates for the purposes of the system, the torch rotation is thus natural to the PTWA process. The torch 26 thus introduces the natural rotation to the wire 24 and affects rotation of the wire 24 while the wire 24 travels via the system from the feed 22 to the torch 26.

The wire 24 is being fed into the rotating torch 26 as high temperature (>10,000° C.) plasma jet is created between the torch 26 (non-consumable electrode) and the wire 24 (consumable electrode). The torch 26 has any dimensions accommodating dimensions of a component to be coated such as that the pressurized air atomizes and accelerates droplets of the molten wire material onto the surface of the substrate to be coated.

The system 20 further includes an anti-twist mechanism 30 capable of correcting or maintaining a degree of twist within a predetermined range. Since the torch 26 is rotating, the wire 24 twists to a certain degree. The anti-twist mechanism 30 is capable of compensating for the torch twist and/or a twist in the wire 24 being present due to manufacturing process and unwinding from the spool or coil, such that the wire 24 rotation or twist remains within a predetermined range of degree of twist or torsion. Additionally, the anti-twist mechanism 30 is capable of correcting twist and kinks within the wire when a twist or kink occurs on the trajectory of the wire from the feed 22 to the torch 26.

The term "kink" may relate to an abrupt change in curvature of the wire within a relatively small distance, the distance being at least the diameter of the wire. The term "twist" relates to a torsional movement of the wire along the long axis of the wire. The twist may be elastic or plastic. Too much plastic deformation may lead to braking of the wire feedstock 24. Likewise, a kink may result in a permanent plastic deformation of the wire 24 which is undesirable.

Due to the rotation of the torch 26, and/or the twist from rotation of the wire feed 22, a twist is bound to be present on the wire 24 at some point in the system 20. Yet, when a desirable degree of twist is exceeded, an undesirable amount of twist may deem the system 20 less efficient or require that the PTWA coating process is interrupted and stopped until the undesirable twist is remedied. The desirable or acceptable degree of twist may be determined as a threshold value or range.

Figure 3A:
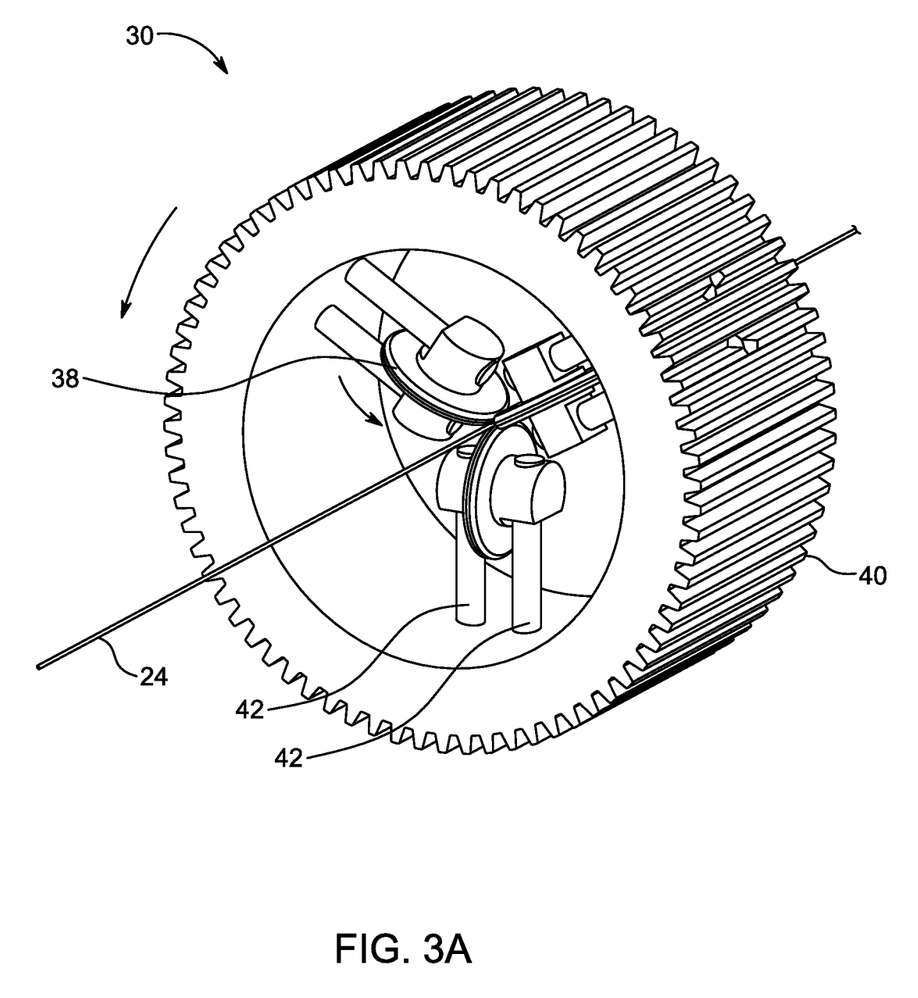
FIG. 3A depicts a perspective view of an example anti-twist mechanism having three rotating elements meeting at the wire which passes through the mechanism as the wire travels to a PTWA torch.
Figure 3B:
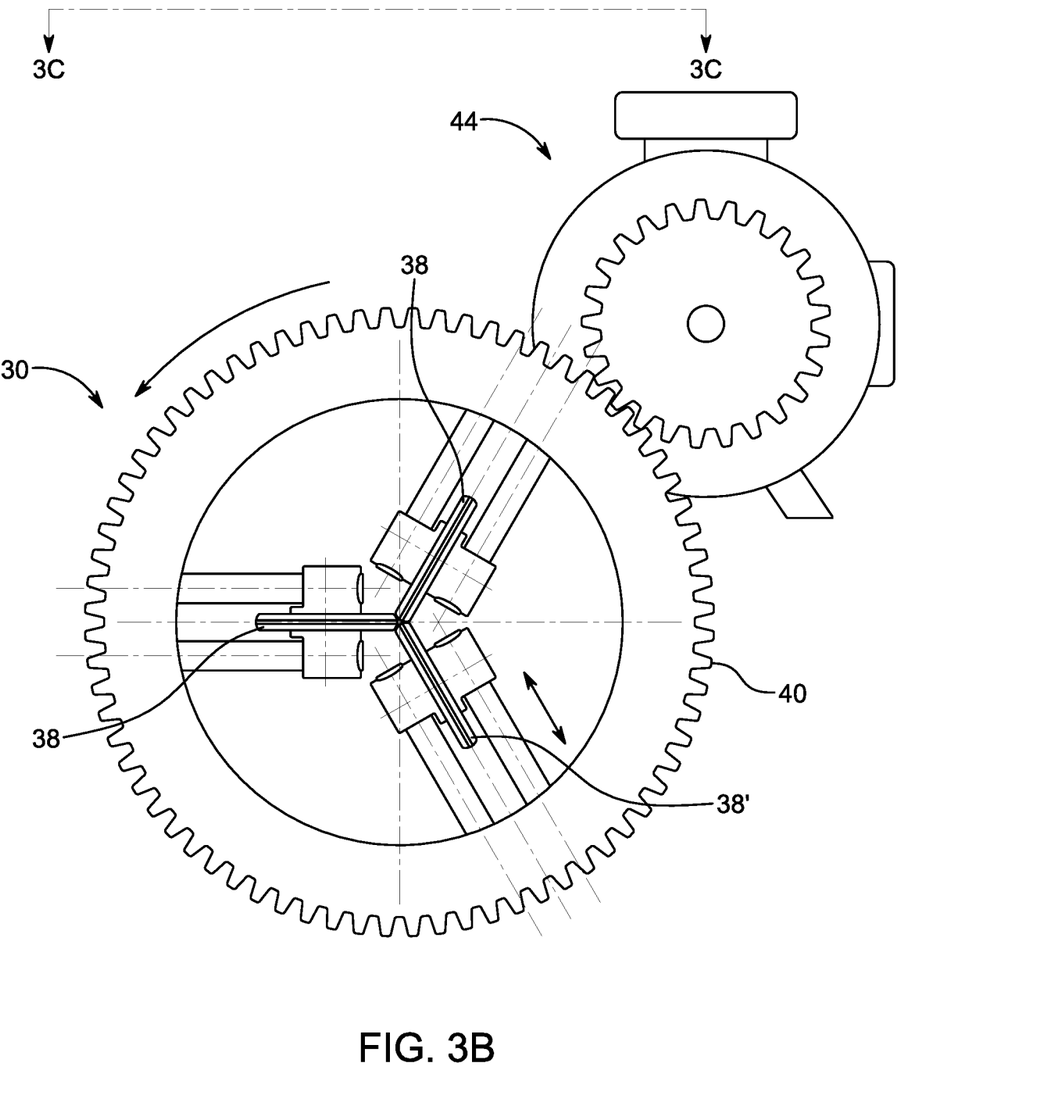
FIG. 3B shows a side view of the anti-twist mechanism depicted in FIG. 3A.
Figure 3C:
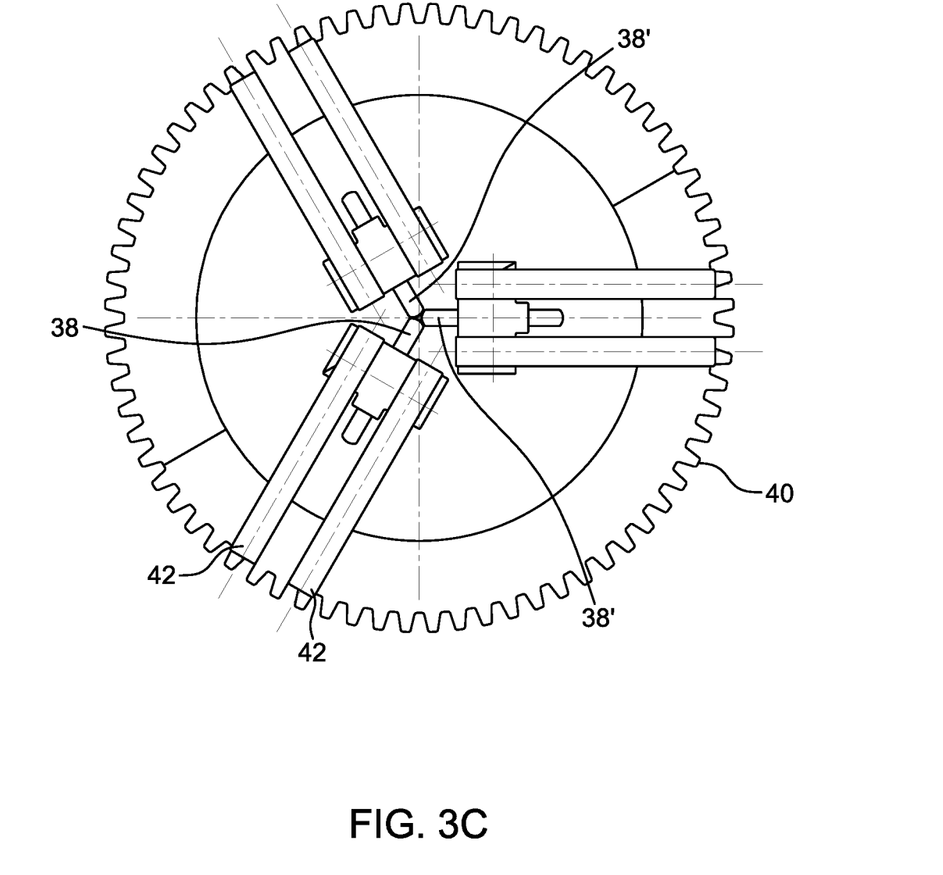
FIG. 3C shows a cross-sectional view of the anti-twist mechanism of FIG. 3B taken along the line 3C-3C.

FIGS. 3A-3C illustrate an example of an anti-twist mechanism 30. The anti-twist mechanism 30 is a mechanism allowing the feedstock wire 24 to pass through the mechanism 30 and is capable of untwisting the wire 24 at the same time. The system may include one or more anti-twist mechanisms 30. An anti-twist mechanism 30 may be located adjacent to a guide roller 36, the feed exit 22, the PTWA torch 26, or anywhere else along the trajectory of the wire 24.

The anti-twist 30 may include a set of objects. The objects may be rotating elements 38. The number of objects or rotating elements 38 may be 2, 3, 4, 5, 6, 7, 8, 9, or more. The rotating element 38 may have any shape, size, configuration as long as the rotating element is capable of spinning around a pivot point. The rotating elements can be rollers, disks, gyres, wheels, casters, washers. The shape of the rotating elements, in cross section, may be circular, oval, regular. While at least some of the rotating elements 38 may be on a fixed axis, at least one of the rotating elements 38 may be on an adjustable axis to fine tune and/or adjust torsion of the wire 24. The rotating element 38', as is depicted in FIG. 3B, has an adjustable axis allowing movement of the rotating element 38' in the direction away from the wire 24 and towards the internal surface of the housing 40 and back. The rotating element 38' may thus apply greater or lesser force on the wire 24, depending on the distance from the wire 24. In at least one embodiment, all of the rotating elements 38 may have adjustable axis. Alternatively, or in addition, at least one or all of the rotating elements 38 may be able to swing out or swivel away from the wire 24, and/or out of the housing 40, enabling wire installation.

FIG. 3A illustrates an example of an anti-twist mechanism 30 including a housing 40. The housing may be arranged as a gear. The housing may have teeth, peaks, valleys, sharp or dull edges, smooth surface, rough surface, of a combination thereof. The housing 40 may have any shape, size, or configuration as long as the housing is capable of securing the objects allowing the wire 24 to pass through, untwist the wire, or both. The housing 40 may have an internal and external surface. Each surface may be the same or different with respect to material and its properties, roughness, dimensions. The housing 40 may include one or more portions.

In the example of FIG. 3A, three rotating elements 38 are secured in the housing 40. The rotating elements 38 may be held by an elongated object 42 such as a pin, screw, rod, shaft, spike, strip, or clamp. The elongated object 42 may protrude through the housing 40, as is further depicted in FIG. 3C. The elongated object 42 allows force to be applied to the wire 24 via the rotating elements 38. Each rotating element 38 has one contact point with the wire 24. Thus, the three rotating elements 38 exert force on the wire 24 via three contact points with the wire 24. The amount of force exerted by each rotating element 38 may be the same, different, may be maintained or adjusted. The anti-twist mechanism 30 is thus capable of adjusting and/or maintaining certain degree of torsion of the wire 24.

The amount or degree of torsion is determined by the one or more controllers 32 based on the data collected from the one or more sensors 34, as was discussed above. The controllers 32 may be programmed to adjust the torsion of the wire 24 by controlling one or more components of the anti-twist mechanism 30 to exert more or less force by one or more rotating elements 38 onto the wire 24, by rotating the anti-twist mechanism 30, by changing the direction and/or speed of rotation of the mechanism 30, a combination thereof, or the like.

The anti-twist mechanism 30 may be connected, via the housing 40, to a motor 44 capable of rotating the anti-twist mechanism 30. An example schematic motor 44 is depicted in FIG. 3B. The motor 44 may be a gear-driven motor. The motor 44 may have varying speed. The motor 44 may turn the anti-twist mechanism 30 clockwise or anti-clockwise such that the anti-twist mechanism 30 may assist in correcting the degree of wire twist. For example, the controller 32 may be programmed to send a signal to the motor 44 to change rotation of the anti-twist mechanism to apply a counter-twist to the wire 24 if the degree of twist exceeds a threshold in one direction.

Figure 4:
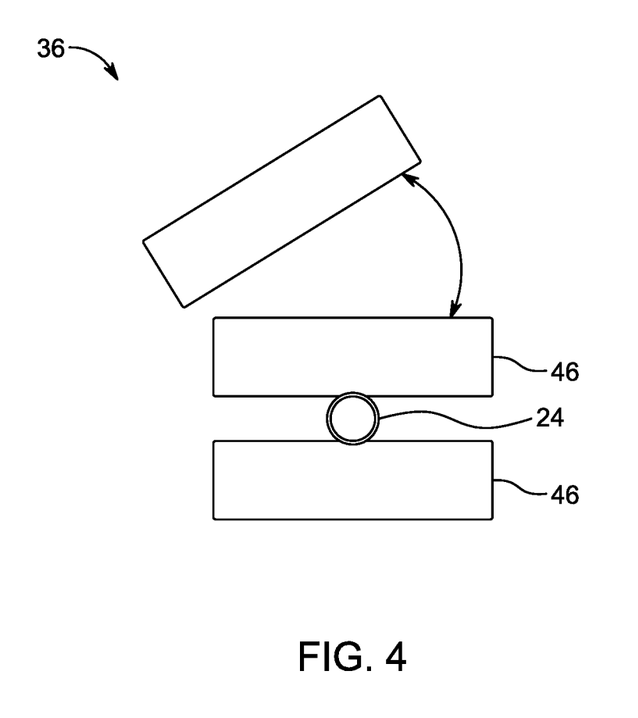
FIG. 4 shows a schematic view of a roller guide showing an upper and lower roller, the upper roller being also depicted in an alternative position with respect to the wire.

The system may further include one or more guide rollers 36 in connection with the anti-twist mechanism 30. The number of guide rollers may be 2, 3, 4, 5, 6, 7, 8, 9, 10, or more. A guide roller 36, as depicted in FIG. 4, may include a roller mechanism including two rollers 46 which allow the wire to pass in between the two rollers 46. The rollers 46 may have any size, shape, and configuration as long as the wire 24 can be led and/or pulled between the two rollers 46. For example, the cross-section of the rollers may be oval, circular, regular. The rollers 46 may have smooth or rough surface. The rollers 46 may have irregularly shaped edge, teeth, spikes, or the like.

At least one of the rollers 46 may be capable of changing location, for example swinging or swiveling open to allow for wire installation. At least one of the rollers 46 may be adjustable to apply variable amount of pressure onto the wire 24, thus assisting with correction of the wire twist. The one or more controllers 32 may be programmed to send a signal to the guide roller 36 or the individual adjustable roller 46 to take the corrective measure.

The location of the guide rollers 36 may differ. For example, the system 20 may include a guide roller 36 before and/or after each anti-twist mechanism 30, adjacent to the exit of the feed 22, adjacent to the entry of the PTWA torch 26, between two adjacent guide rollers 36, or anywhere along the trajectory of the wire 24. For example, a guide roller 36 may be placed adjacent to an exit of the wire feed 22 to prevent excessive twist due to uncoiling.

The size and shape of the rollers 46 may differ. For example, the system may employ guide rollers 36 having rollers 46 of different sizes. A guide roller 36 having rollers 46 of a greater length than the remaining guide rollers 36 may be used to in the portion of the trajectory which would otherwise lack any device supporting the wire on its journey from the feed 22 to the torch 26.

Figure 5A:
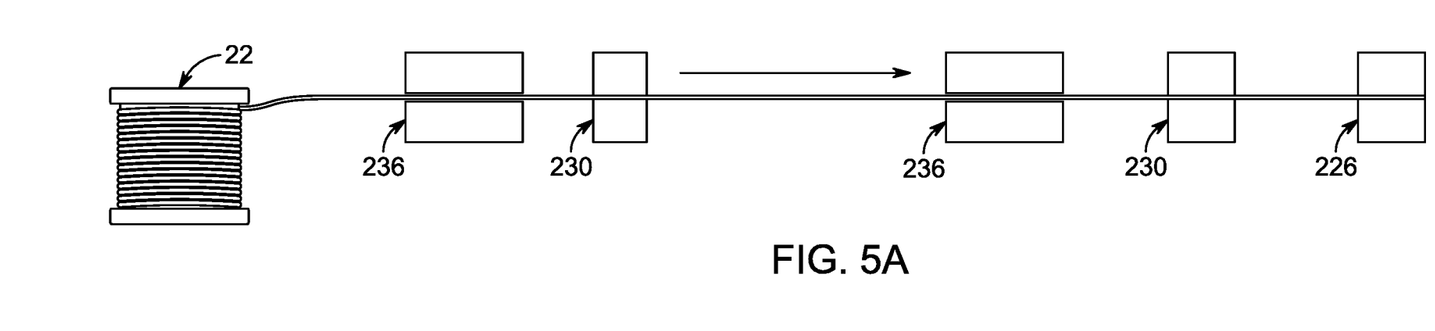
FIGS. 5A-5C show schematic example systems according to one or more embodiments, the systems depicting various locations and variable dimensions of various devices described herein.
Figure 5B:
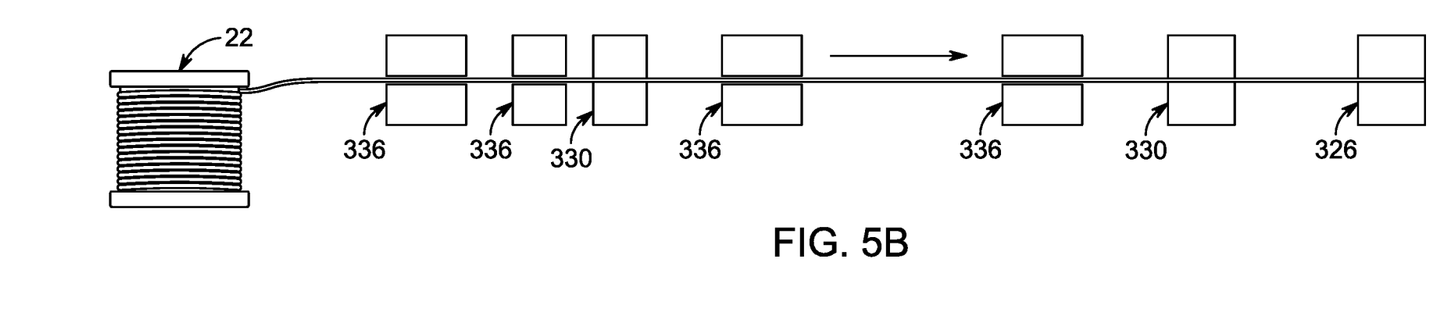
Figure 5C:
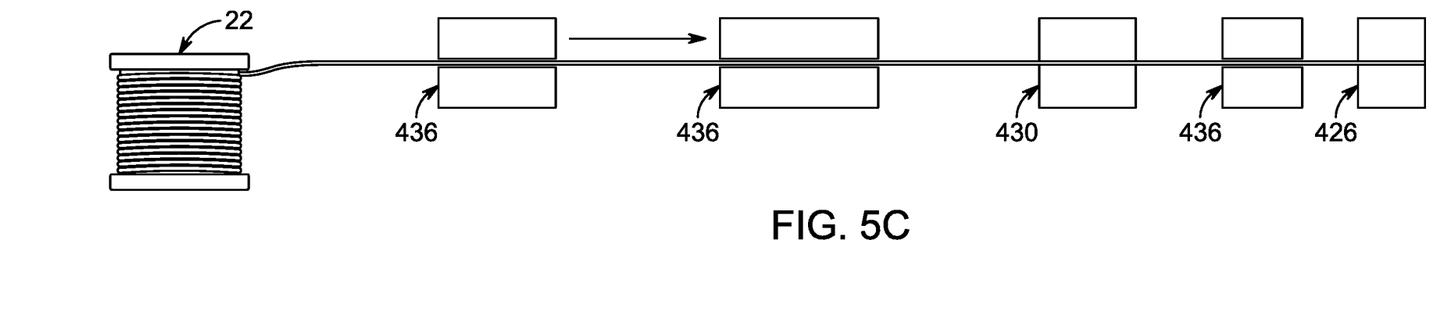

As is illustrated in FIG. 2A, the system 20 may be a fixed axis setup without utilization of a robotic arm. In contrast, in FIG. 2B, the system 120 may include one or more robot arms 138. The robot arm 138 may carry both the wire 124 and the torch 126. As FIGS. 2A and 2B further illustrate, the amount and/or placement of the anti-twist mechanism 30, 130, and/or guide rollers 36, 136 may vary depending on the system set-up. FIGS. 5A-5C further schematically illustrate other embodiments showing variable location of the anti-twist mechanisms 30 and the guide rollers 36.

The system may also include additional devices such as one or more straighteners, one, a roller mechanism to pull the wire from the feed 22, or the like.

Referring back to FIGS. 2A and 2B, the system 20 also includes one or more controllers 32. The one or more controllers 32 may be programmed to determine the threshold value or range. The one or more controllers 32 may be programmed to operate the anti-twist mechanism 30 responsive to a measured degree of twist of the wire 24 on the trajectory between a feed 22 for the wire 24 and the torch 26. The controller 32 may be programmed to maintain the degree of twist within the predetermined range defined by natural rotation introduced to the wire 24 by the PTWA torch 26. In addition to the natural torch rotation, the system disclosed herein including the anti-twist mechanisms 30, guide rollers 36, controllers 32, and/or sensors 34 is capable of detecting, maintaining, adjusting, changing, controlling, and/or correcting other torsional events as the wire is transported to the torch 26.

The controller 32 may be programmed to control, maintain, adjust, alter the twist of the wire 24 traveling between a wire feed mechanism 22 and the torch 26 to prevent a degree of twist from exceeding the predetermined threshold. The adjusting or altering may include single or multiple instances of correction of the twist. The adjusting may occur in regular intervals or irregularly, based on the identified needs to alter the degree of the twist of the wire 24.

The one or more controllers 32 may be programmed to derive the measured degree of twist from data supplied by one or more sensors 34, and/or additional input. The supplied data may include residual stress data of the wire 24. Residual stress data may relate to data from inside the wire 24. Residual stress data may relate to shear stress values of the wire 24.

The controllers 32 may have one or more processing components such as one or more microprocessor units (not depicted) which enable the controllers 32 to process input data. AS was stated above, the input data may be supplied from one or more sensors 34 included in the system 20. The input data may be also, or in the alternative, supplied from a computer system (not depicted). The input data may include data about the wire feedstock 24 such as material properties, dimensions such as diameter, length, wire residual stress data; data regarding the expected, undesirable, and/or allowable degree of twist; speed of rotation of the torch; trajectory of the wire; data regarding individual components and functions of the anti-twist mechanism 30 and/or guide rollers 36 such as a distance between individual rotating elements 38 or rollers 46, force exerted onto the wire 24 by the individual rotating elements 38 or rollers 46, or the like, or a combination thereof. The input data supplied from the sensors 34 may include real time sensing data. The sensors 34 may be collecting and sending signals to the controllers 32 continuously, at predetermined intervals, or randomly.

At set intervals, the one or more controllers 32 compare the signal from the one or more sensors 34 to a predefined set point or a predetermined range of values related to acceptable torsion of the wire 24 in the system 20. The set interval may include immediate analysis of data after receiving the data from one or more sensors 34. If the input signal deviates from the set point or the range, the controllers 32 provide a corrective output signal to one or more portions of the system 20. The one or more portions may be the one or more anti-twist mechanisms 30. In addition, guide rollers 36 may be also included in the system, the guide rollers 36 being capable of correcting the degree of wire twist. The one or more controllers 32 may dynamically alter a degree of twist of the wire 24 based on the data provided by the one or more sensors 34. The data may include residual stress exceeding a predetermined threshold, distance between individual components of the anti-twist mechanism 30 and/or guide rollers 36, force exerted by the individual components of the anti-twist mechanism 30 and/or guide rollers 36 onto the wire 24, a combination thereof, or the like.

The sensors 34 may include one or more types of sensors. The sensors 34 may include single point sensors or sensors monitoring a spectrum of values. The sensor 34 may be any sensor capable of measuring the amount of residual stress in the wire 24 or another property which enables the one or more controllers 32 to determine the amount of residual stress in the wire 24. For example, the sensors 34 may be ultrasonic sensors capable of sensing vibration of the wire 24. The ultrasonic sensors may provide the vibration data to the controllers 32 which may compare vibrations from different locations within the wire trajectory, compare the vibration to preset values, and/or conduct calculations resulting in obtaining residual stress data. Another type of sensor 34 may be a load transducer mounted as a part of the anti-twist mechanism 30 and/or the guide roller 36. This type of sensor 34 may detect a force of individual components of the mechanism 30 or roller 36 such that if the sensor 34 senses a greater force from a first rotating element 38 than from the remaining rotating elements 38, the data would indicate that the system in not balanced, further indicating a twist of an undesirable degree. A yet another option for a sensor 34 may be a displacement transducer capable of sensing a distance or force between individual components of the anti-twist mechanism 30 and/or the guide rollers 36.

The sensors 34 may be installed at a variety of locations throughout the system 20. For example, a sensor 34 may be located adjacent to an exit of the feed 22, adjacent to, at, on, or within an anti-twist mechanism 30 and/or a guide roller 36, adjacent to an entrance of the PTWA torch, or in a different portion of the wire trajectory. The type of sensor 34 implemented determines the location. As was mentioned above, certain types of sensors 34 are suitable for applications in a close vicinity of individual components of the mechanism 30 or roller 36, at or near at least one or all of the rotating elements 38, on the wire 24, a combination thereof, of the like.

Based on the input data, the one or more controllers 32 determine the threshold range of residual stress. Based on the real time monitoring input data, the one or more controllers 32 determine, calculate, and/or compare the data from all, some, or at least some of the sensors 34 to the threshold range. If a corrective measure is required, the one or more controllers 32 send a signal to one or more components of the system capable of carrying out the corrective measures. For example, the one or more controllers 32 may send a signal to the motor 44 to increase or decrease rotation of the one or more anti-twist mechanisms 30. The one or more controllers 32 may send a signal to the anti-twist mechanism 30 itself to adjust distance of one or more rotating elements 38 with respect to the wire 24 to adjust force with which at least one of the rotating elements 38 applies pressure onto the wire 24. Other components may be capable of adjusting the degree of wire twist within the system in additional ways.

In one or more embodiments, a method is provided for monitoring of a wire feed into a PTWA system. The method includes altering by a controller 32 a twist of a wire 24 traveling between a wire feed mechanism 22 and the PTWA torch 26, in response to a degree of the twist exceeding a predetermined threshold based on a residual stress differential of the wire 24. The method may include determining a range of acceptable degree of twist or torsion of the wire 24. The determining may be based on natural rotation introduced to the wire 24 by the PTWA torch which rotates. The method may include detecting residual stress of the wire 24 at one or more locations between the wire feed 22 and the PTWA torch 26. The method may include collecting various data about the wire 24 including the residual stress of the wire 24. The method may include calculating the torsion, degree of twist, residual stress based on input provided to the controller 32 by the one or more sensors 34 and/or additional sources such as a computer system. The method may include altering, adjusting, maintaining a degree of twist of the wire 24 to be within the predetermined range of twist. The method may include removing and/or adjusting twist and/or kink of the wire 24.

The method may include entering and/or updating input data relating to the system including data relating to the material properties of the wire 24, dimensions and/or material properties of rotating elements 38, the amount and/or location of the one or more anti-twist mechanisms 30, guide rollers 36, or one or more individual components of the mechanisms 30 and/or rollers 36, wire feed direction, length of the wire trajectory, dimensions of the feed 22, the amount of the wire 24 loaded on the feed 22, the type and location of the sensors 34, or the like. The input data may be supplied to the one or more controllers 32. The input data may be then processed, the threshold range may be calculated, and based on the calculated and/or measured threshold amounts, the wire twist may be optimized.

A step of installing one or more electronic sensors 34 at predetermined locations within the system and providing input data to one or more controllers 32 may be included. The measurement locations for the one or more sensors 34 may be selected based on the required data to be supplied to the controllers 32. The data from the sensors 34 may be continuously supplied to the controllers 32. The input signals from the sensors 34 may be received by the controllers 33. The controllers 32 may send output signals to one or more portions of the system such as the motor 44, the rotating elements 38, the anti-twist mechanism 30, the guide rollers 36.

The method may include checking if the degree of twist of the wire is stabilized. The checking may be regular, irregular, random, once or more times during a set period of time. The checking may begin immediately after the PTWA system is activated. Upon identifying that the degree of twist has exceeded the threshold amount, altering may be initiated. Altering may include increasing or decreasing force exerted by one or more rotating elements 38 onto the wire 24. Altering may include increasing and/or decreasing the speed of the motor 44. Altering may include increasing and/or decreasing a distance of one or more of the rotating elements 38 and/or rollers 46 with respect to the wire 24 passing in between the rotating elements 38 and/or the rollers 46.

Figure 6:
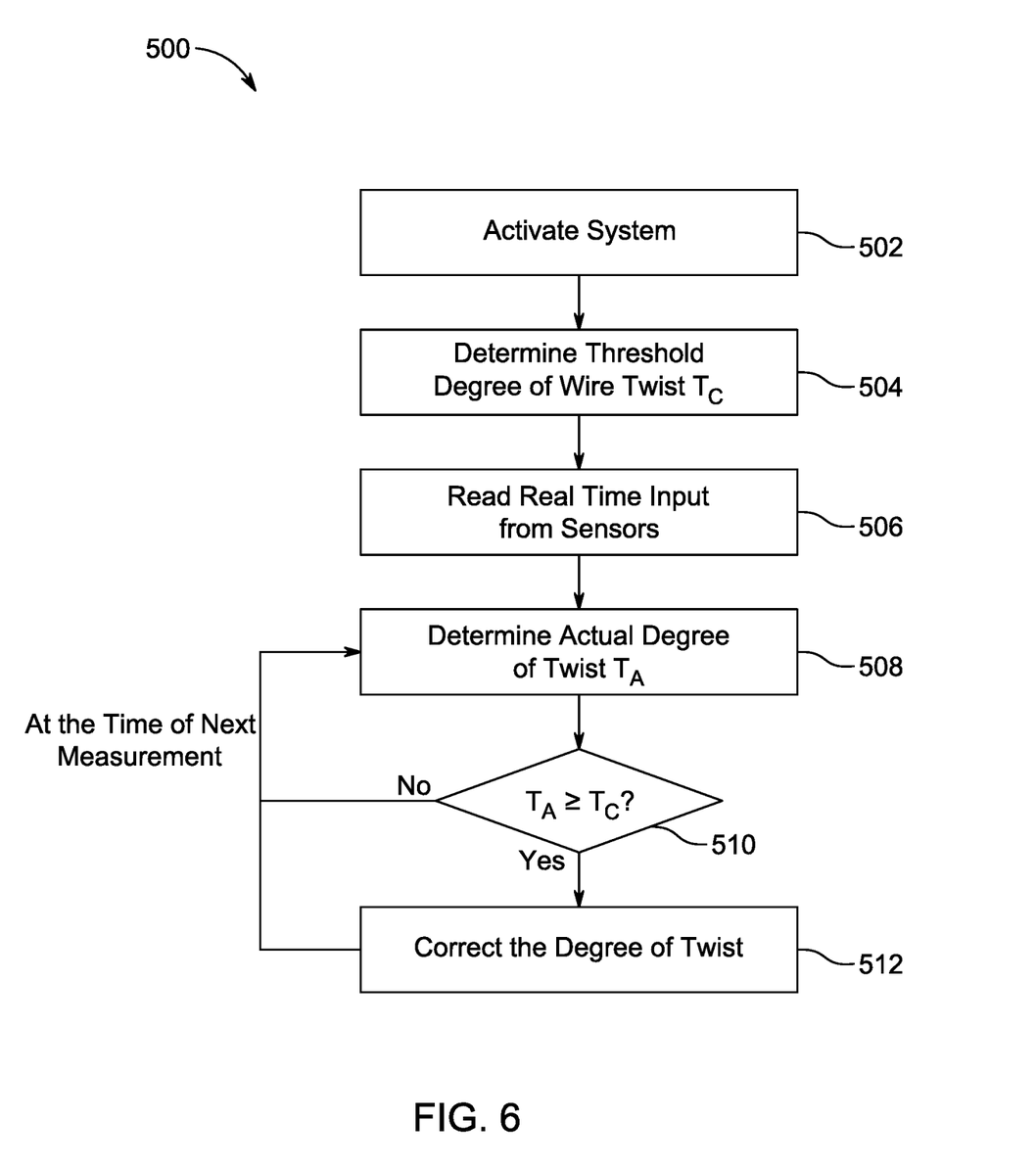
FIG. 6 shows a series of steps to carry out a method according to one or more embodiments.

FIG. 6 illustrated the method for adjusting wire twist in the above-described system employing a PTWA torch and a wire feed. The method may begin at block 502, where the system is activated manually or automatically. In one example, a controller 32 may activate the system 20. At block 504, the controller may determine the threshold degree of twist $T_C$ of the wire 24 based on provided input. Alternatively, the threshold range, amount, or value of the wire twist or torsion may be determined outside of the controller 32 and provided to the controller 32 as one of the input values. At step 506, one or more sensors 34 provide real-time signals to the controller 32. The controller 32 determines, based on the real-time signals from the one or more sensors 34, the actual degree of wire twist $T_A$ at step 508. The controller then, at step 510, compares $T_C$ to $T_A$. If $T_A$ equals or exceeds $T_C$, the controller 32 sends an output signal to one or more portions of the system to initiate corrective measure. If $T_A$ does not exceed $T_C$, the controller does not initiate any corrective action, and after a preset time, the controller 32 again evaluates real-time signals from the one or more sensors 34.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A wire feed control system comprising:
an anti-twist mechanism; and
a controller programmed to
operate the anti-twist mechanism, responsive to a measured degree of twist of a wire on a trajectory between a feed for the wire and a plasma transfer wire arc (PTWA) torch, to maintain the degree of twist within a predetermined range defined by natural rotation introduced to the wire by the PTWA torch, and to
derive the measured degree of twist from input data supplied from one or more sensors.

2. The system of claim 1, wherein the input data comprises residual stress data of the wire.

3. The system of claim 1, wherein the input data comprises an amount of force exerted by one or more individual components of the anti-twist mechanism against the wire.

4. The system of claim 2, wherein the sensor is an ultrasonic sensor.

5. The system of claim 3, wherein the sensor is a displacement transducer.

6. The system of claim 1, wherein the anti-twist mechanism includes a set of rotating elements surrounding the wire.

7. The system of claim 1, wherein the anti-twist mechanism is adjacent to an exit of the feed.

8. The system of claim 1, wherein the anti-twist mechanism is adjacent to an entrance of the PTWA torch.

9. A wire feed control system comprising:
a controller programmed to alter a twist of a wire via an anti-twist mechanism, the wire traveling between a wire feed mechanism and a plasma transfer wire arc (PTWA) torch based on a residual stress differential of the wire, supplied by one or more sensors to the controller, to prevent a degree of the twist from exceeding a predetermined threshold.

10. The wire feed control system of claim 9, wherein the controller is further programmed to operate the anti-twist mechanism to alter the twist of the wire.

11. The wire feed control system of claim 9, wherein the anti-twist mechanism includes a set of rotating elements surrounding the wire.

12. The wire feed control system of claim 9, wherein the anti-twist mechanism is adjacent to an exit of the feed.

13. The wire feed control system of claim 9, wherein the predetermined threshold is defined by natural rotation introduced to the wire by the PTWA torch.

14. The wire feed control system of claim 9, wherein the controller is further programmed to operate the one or more sensors to collect residual stress data.

15. A monitoring method for a wire feed control system comprising:
altering by a controller a twist of a wire traveling between a wire feed mechanism and a plasma transfer wire arc (PTWA) torch, in response to a degree of the twist exceeding a predetermined threshold based on a residual stress differential of the wire supplied by one or more sensors.

16. The method of claim 15, wherein the wire feed control system further comprises an anti-twist mechanism, and wherein the controller is further programmed to operate the anti-twist mechanism to alter the twist of the wire.

17. The method of claim 16, wherein the anti-twist mechanism includes a set of rotating elements surrounding the wire.

18. The method of claim 16, wherein the anti-twist mechanism is adjacent to an exit of the feed.

19. The method of claim 15, wherein the predetermined threshold is defined by natural rotation introduced to the wire by the PTWA torch.

20. The method of claim 15, wherein the controller is further programmed to operate the one or more sensors to collect residual stress data.

* * * * *